United States Patent
Ehrhardt et al.

(10) Patent No.: US 6,550,755 B2
(45) Date of Patent: Apr. 22, 2003

(54) ARRANGEMENT WITH A HELICAL SPRING AND A SUPPORT BEARING FOR SPRING STRUTS

(75) Inventors: Herbert Ehrhardt, Herzogenaurach (DE); Ulrich Grau, Emskirchen (DE); Gerhard Meyer, Lehrberg (DE); Alexander Zernickel, Herzogenaurach (DE); Vladimir Kobelev, Attendorn (DE); Markus Röhling, Kreuztal (DE)

(73) Assignees: INA Walzlager Schaeffler OHG (DE); Muhr und Bender KG (DE)

( * ) Notice: Subject to any disclaimer, the term of this patent is extended or adjusted under 35 U.S.C. 154(b) by 0 days.

(21) Appl. No.: 09/937,958

(22) PCT Filed: Dec. 16, 2000

(86) PCT No.: PCT/EP00/12835

§ 371 (c)(1),
(2), (4) Date: Mar. 15, 2002

(87) PCT Pub. No.: WO01/56818

PCT Pub. Date: Aug. 9, 2001

(65) Prior Publication Data

US 2002/0113353 A1 Aug. 22, 2002

(30) Foreign Application Priority Data

Jan. 31, 2000 (DE) .......................... 100 04 121

(51) Int. Cl.$^7$ .............................. F16F 1/06; F16F 1/12; B60G 11/14; B60G 15/02; B60G 15/06
(52) U.S. Cl. ............... 267/286; 267/170; 267/179; 280/124.179; 280/124.155; 384/615
(58) Field of Search .................. 267/179, 286, 267/166, 170, 178, 221, 222, 220; 280/124.155, 124.147, 124.146, 124.145, 124.179, 124.151, 124.154; 384/615, 611, 614, 125

(56) References Cited

U.S. PATENT DOCUMENTS

| | | | | |
|---|---|---|---|---|
| 4,552,467 A | * | 11/1985 | Takai et al. | 384/615 |
| 5,467,971 A | * | 11/1995 | Hurtubise et al. | 267/179 |
| 5,664,892 A | * | 9/1997 | Kellam | |
| 6,257,605 B1 | * | 7/2001 | Zernickel et al. | 280/124.155 |

FOREIGN PATENT DOCUMENTS

DE  35 01 106 A  7/1986

(List continued on next page.)

OTHER PUBLICATIONS

Copy of International Search Report for PCT/EP00/12835, European Patent Office, Mar. 16, 2001.

*Primary Examiner*—Douglas C. Butler
(74) *Attorney, Agent, or Firm*—Harness, Dickey & Pierce, P.L.C.

(57) ABSTRACT

A coil spring (1) and support bearing (2) arrangement for suspension struts (3) with a shock absorber, supporting a steering knuckle of an automobile has a rolling-contact bearing (7), with an axis (x); a receiving body (6), arranged below the rolling-contact bearing (7) in which the rolling-contact bearing is inserted; and a coil spring (1). The coil spring (1) has a force application line (f), which is offset relative to the axis (x) of the rolling-contact bearing (7) at an angle (a). The coil spring (1) has a first portion (8), which, starting from the winding end (17), winds around the receiving body (6). The first portion (8) abuts the receiving body (6). The winding end (17) of the coil spring (1) is arranged in the area of the plane $E_1$ formed by the force application line (f) and the axis (x). Thus, the axial forces acting from the coil spring (1) onto the rolling-contact bearing (7) have a maximum in the area of the force application line (f) of the transversal forces acting on the rolling-contact bearing (7).

10 Claims, 3 Drawing Sheets

FOREIGN PATENT DOCUMENTS

| | | | |
|---|---|---|---|
| DE | 3743451 | * | 6/1989 |
| DE | 41 10 417 A | | 10/1991 |
| DE | 4126501 | * | 2/1992 |
| DE | 4339820 | * | 6/1994 |
| DE | 4408859 | * | 7/1995 |
| DE | 19516271 | * | 11/1996 |
| DE | 10004121 | * | 8/2001 |
| FR | 2 540 586 A | | 8/1984 |
| FR | 2600595 | * | 12/1987 |
| FR | 2644735 | * | 9/1990 |
| FR | 2 670 437 A | | 6/1992 |
| FR | 2 730 673 A | | 8/1996 |
| FR | 2 768 659 A | | 3/1999 |
| JP | 7276939 | * | 10/1995 |
| WO | 89 05242 | | 6/1989 |

* cited by examiner

ARRANGEMENT WITH A HELICAL SPRING AND A SUPPORT BEARING FOR SPRING STRUTS

CROSS-REFERENCE TO RELATED APPLICATIONS

This application is the national phase filing of PCT Application Serial No. PCT/EP00/12835 which claims priority to German Patent Application No. 100 04 121.3 filed Jan. 31, 2000, which applications are herein expressly incorporated by reference.

FIELD AND BACKGROUND OF THE INVENTION

The present invention relates to a coil spring and a support bearing arrangement for suspension struts, which support steering knuckels of an automobile.

Suspension struts for automobiles have a shock absorber connected at its upper end to the car body and at its lower end to the steering knuckle. A coil spring surrounds the shock absorber. The lower end of the coil spring is connected to the shock absorber via a coil spring seat. A support bearing, with a receiving body, receives the upper end winding of the coil spring. The support bearing is rigidly connected to the winding. A rolling-contact bearing is connected to the receiving body on one side and is connected to the car body on the other side. The rolling-contact bearing enables rotation of the coil spring during the steering movement of the wheels.

WO 89/05242 discloses a McPherson suspension strut which has a support bearing with a receiving body connected to the support bearing and a coil spring. Here, the receiving body receives the bearing race on the side of the spring of the support bearing. The receiving body is supported by a multitude of ribs distributed over the front side of the receiving body. The receiving body has formations corresponding to the spring against the end winding of the coil spring. The coil spring axis is arranged at an angle relative to the shock absorber axis.

DE 35 01 106 A1 discloses an arrangement with a support bearing and a coil spring for suspension struts. The winding diameter of the coil spring decreases in the upper area down to the mean diameter of the bearing mounted on the side of the car body. The coil spring elastically supports the piston rod of the shock absorber. Here, the axis of the coil spring is inclined to the outside relative to the axis of the shock absorber. This alignment enables a better transversal force compensation. The transversal forces are absorbed by the radial ball bearing.

In suspension struts, where the end winding of the coil spring is supported directly on a support bearing, the force application line of the coil spring is arranged at an angle relative to the axis of the shock absorber. In cases where the rolling-contact bearing, which is part of the support bearing, is arranged centered on the axis of the shock absorber, the interplay between the radial and the axial forces in the rolling-contact bearing is problematic. Due to the angled coil spring, radial forces also act on the rolling-contact bearing in addition to the axial forces. Here, the axial forces are not constant over the circumference of the winding end of the coil spring. Due to the manufacturing tolerances, the axial forces have their maximum at the winding end and between the winding end and the end of the abutment face of the rolling-contact bearing or a minimum to the receiving body of the support bearing, respectively.

If the transversal force acting on the bearing, due to the coil spring arranged at an angle relative to the shock absorber, is introduced such that no axial force is present in the area of the force application line of the transversal force, the balls of the bearing are not held in position in the groove bottom. The balls can run out of the groove bottom which results in a radial displacement of the two bearing races. Because of this, the sealing rings, into which the bearing races are inserted, can contact each other and an increased torque can be produced. Again, the increased force can lead to a degradation of the steering function and a reduction of the life time of the support.

SUMMARY OF THE INVENTION

It is an object of the present invention to provide a coil spring and support bearing arrangement for suspension struts supporting steering knuckles, where the transmission of the force acting from the coil spring onto the support bearing is optimized when the force application line of the coil spring is offset relative to the axis of the rolling-contact bearing of the support bearing.

A coil spring and a support bearing have a bearing centered on a first axis. A first receiving body is centered on the first axis and is arranged below the bearing and receives the bearing. A coil spring, having a force application line, is arranged at an angle relative to the first axis. An end winding of the coil spring at least partially winds around the first insertion body. The end winding end faces the rolling-contact bearing and has a winding end. The winding end lies within the area of a predetermined angle to a first plane. The angle is formed by the force application line and by the first axis. The first plane represents the bisector of the angle.

In this embodiment, the axial forces, which pretension the rolling-contact bearing to achieve a contact of the balls with the bearing races, have their maximum in the area of the force application line of the transversal force. This effectively prevents the balls of the rolling-contact bearing from run out off the grooves formed by the bearing races which, in turn, would lead to degradation of the bearing function and to reduction of the lifetime. Since the coil spring directly abuts the receiving body, the construction is simplified, which leads to a reduction of the manufacturing costs.

According to a further aspect of the present invention, the coil spring has a first portion which starts from the winding end. The first portion has at least a constant radius over a predetermined winding angle around the axis. The first portion of the coil spring is arranged in a second plane perpendicular to the axis. The radius of the first portion of the coil spring is approximated to the radius of the rolling-contact bearing. Because of this arrangement, the spring force can be directly introduced into the rolling-contact bearing without using additional components.

In accordance with the following aspect of the present invention, the coil spring has a cranked second portion continuous with the first portion of the end winding. The second portion increases the radius of the coil spring where the coil spring leaves the second plane. Because of the cranking of the coil spring, winding angles of the end winding around the first receiving body or the rolling-contact bearing of 200° or more are achievable, respectively. Thus, the spring force can achieve a uniform force distribution along a large winding angle onto the rolling-contact bearing.

In a further embodiment, a damping body is arranged between the first portion of the coil spring and the bearing receiving body. The damping body prevents transmission of vibration onto the car body of the automobile, increasing driving comfort.

Preferably, the rolling-contact bearing is formed as an axial rolling-contact bearing or as an angular contact ball bearing. Generally, axial forces of the coil spring act on the rolling-contact bearing.

In a further preferred embodiment, the winding end is positioned in a predetermined angle bisected by the first plane, which is formed by the force application line of the coil spring and the axis, and the predetermined angle equals 30°. This has the advantage that the axial forces acting from the coil spring onto the rolling-contact bearing have their maximum in the area of the winding angle. Also, the transversal forces, resulting from the offsetting of the coil spring relative to the axis, are acting in this area. Thus, the winding end is arranged on the side of the angle of attack of the force application line relative to the first axis or on the side facing away from the angle of attack.

From the following detailed description, taken in conjunction with the drawings and subjoined claims, other objects and advantages of the present invention will become apparent to those skilled in the art.

DETAILED DESCRIPTION OF THE PREFERRED EMBODIMENTS

Figure 1:
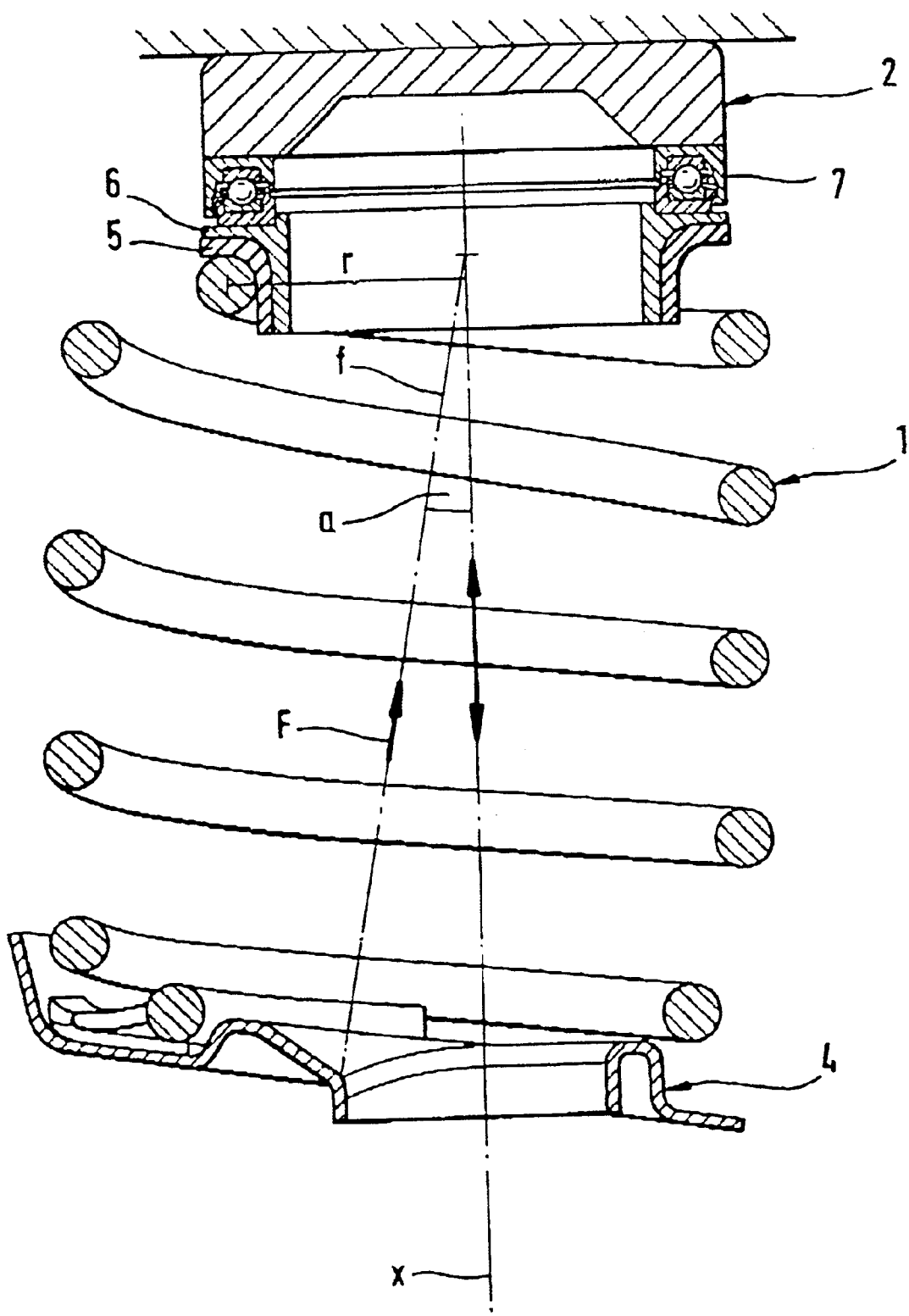
FIG. 1 is a longitudinal sectional view of a coil spring with an upper support bearing.

A coil spring 1 and an upper support bearing 2 arrangement for a suspension strut 3 of an automobile is shown in FIG. 1.

The upper end of the coil spring 1 is supported by a damping body 5, in the form of a rubber backing. Also, a receiving body 6 on a rolling-contact bearing 7, arranged on the side of the car body, supports the coil spring 1. The coil spring 1 is arranged on an axis (x). The force application line (f) of the coil spring is arranged at an angle (a) relative to the axis (x). The coil spring 1 is received in a coil spring seat 4 at its end facing the wheel axle. The coil spring seat 4 is connected to a shock absorber.

Figure 2:
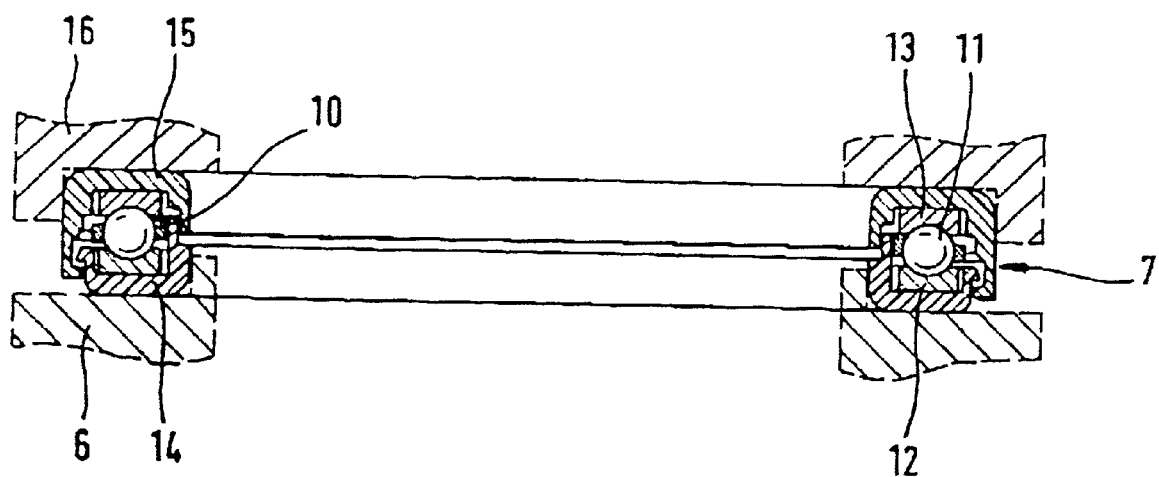
FIG. 2 is a longitudinal sectional view of the support bearing according to FIG. 1.

As can be seen in FIG. 2, the rolling-contact bearing 7 is designed as an encapsulated axial grooved ball bearing. A cage 10 with balls 11 is arranged in the openings of the cage 10. Two bearing races 12, 13 are inserted into a lower sealing ring 14, and an upper sealing ring 15, respectively. The rolling-contact bearing 7 is guided between the receiving body 6, on the lower side, and an attachment element 16, on the upper side, to mount to the vehicle body to take up the axial and radial forces.

The receiving body 6 and the damping body 5 are formed sleeve-like in the direction of the coil spring 1. The receiving body 6 and damping body 5 may be wound onto the coil spring 1. The radius (r) of the first portion 8 of the coil spring 1, in which the coil spring winds around the receiving body 6 or the damping body 5, respectively, around the angle (c) corresponds roughly to the radius of the rolling-contact bearing 7. The angle (c) may be 200° or more. This has the advantage that the spring force F acts directly on the rolling-contact bearing 7. See FIG. 4.

Figure 3:
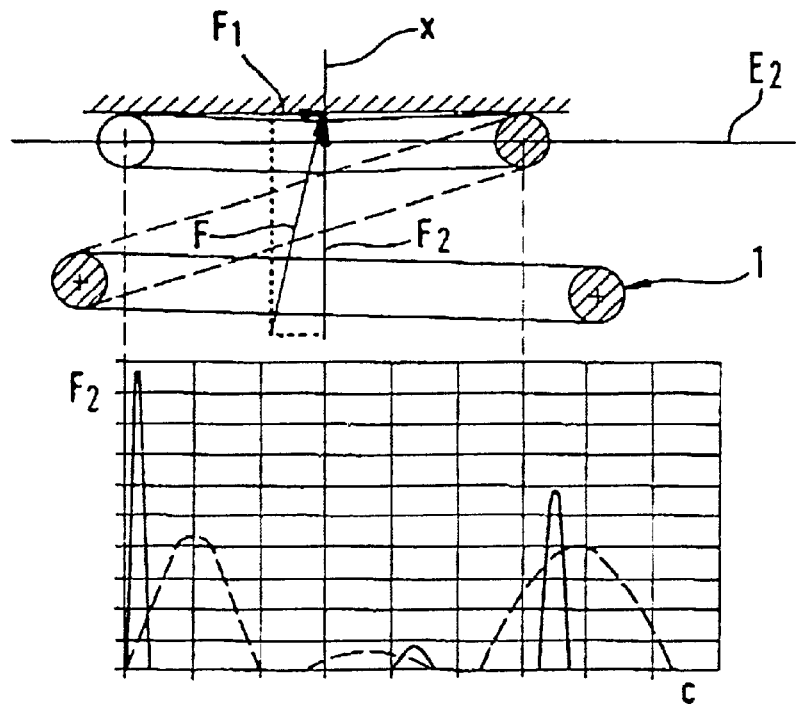
FIG. 3 is a diagram of the force distribution at the contact position of the coil spring with the rolling-contact bearing.
Figure 4:
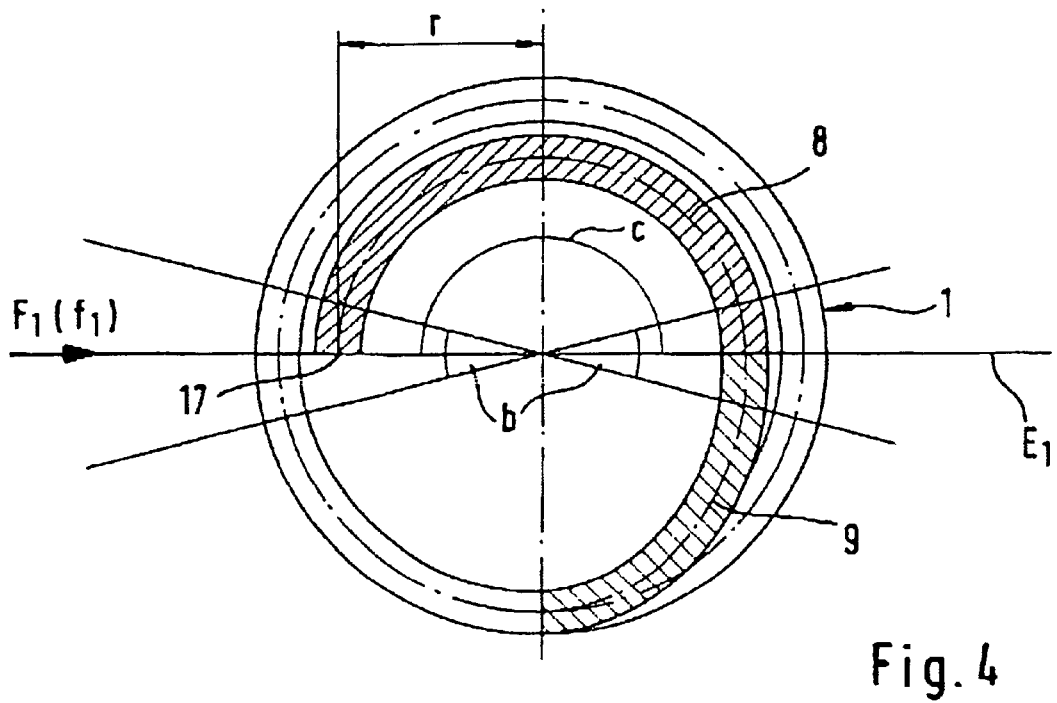
FIG. 4 is a plan view partially in section of a coil spring according to FIG. 1.

The force transmission of the coil spring 1 into the receiving body 6 and therefore, also into the rolling-contact bearing 7 is not constant over the first portion 8 of the coil spring 1 winding around the receiving body 6. Rather, as shown in FIGS. 3 and 4, the maximum forces are introduced at the winding end 17 and at the portion of the coil spring 1, in which the coil spring 1 still abuts the rolling-contact bearing 7 or the receiving body 6, respectively, before the coil spring 1 leaves the second plane $E_2$. The axial pretension of the rolling-contact bearing 7 is at a minimum in the area where the coil spring 1 discharges no axial force $F_2$ into the rolling-contact bearing 7. Here, there is a danger that the transversal force $F_1$, resulting from the angle of attack of the coil spring 1 relative to the axis x of the rolling-contact bearing 7 may force the bearing races 12, 13 to move away from each other.

In FIG. 3, the solid line shows the axial force $F_2$ acting on the rolling-contact bearing over the winding angle (c) when the wheel suspension is in a maximum rebound position. The dashed line defines the axial force $F_2$ over the winding angle when the wheel suspension is in a maximum compression position (metal-to-metal position).

To prevent this movement, the coil spring 1 is arranged such that the maximum of the axial force $F_2$ acting on the rolling-contact bearing 7 lies in the area of the force application line $f_1$ of the transversal forces $F_1$. This is achieved, as shown in FIG. 4, by arranging the winding end 17 of the coil spring 1 within a predetermined angle (b) relative to the plane $E_1$. Plane $E_1$ is formed by the force application line (f) and the axis (x). Also, the plane $E_1$ bisects the predetermined angle (b) which is equal to 30°. Here, the winding end 17 can be arranged on the side of the suspension strut 3 facing the angle of attack of the force application line (f) relative to the axis (x) or on the side facing away from the angle of attack.

The winding end 17 of the coil spring 1 is positioned in an area defined by the predetermined angle (b). The transversal force $F_1$ along the force application line $f_1$ causes the balls 11 of the rolling-contact bearing 7 in the area defined by the angle (b) to move. However, due to the especially strong pretensioned force $F_2$ in the axial direction, the balls 11 remain in the groove bottom of the bearing races 12, 13. Thus, a radial displacement of the bearing races 12, 13 and also the sealing rings 14, 15 relative to each other, is prevented.

While the above detailed description describes the preferred embodiment of the present invention, the invention is susceptible to modification, variation and alteration without deviating from the scope and fair meaning of the subjoined claims.

What is claimed is:

1. A coil spring and a support bearing arrangement for suspension struts, comprising:

a rolling-contact bearing centered on a first axis;

a first receiving body, centered on the first axis and arranged below the rolling-contact bearing, said first receiving body receiving the rolling-contact bearing;

a coil spring having a force application line which is arranged at an angle to the first axis, a first portion of said coil spring on an end facing the rolling-contact bearing, said first portion at least partially winds around the first receiving body and having a winding end, said winding end positioned within an area of a predetermined angle to a first plane, said first plane formed by the force application line and by the first axis, wherein the first plane represents the bisector of the predetermined angle.

2. The arrangement according to claim 1, wherein the first portion of the coil spring starting from the winding end has a radius which is at least constant over a predetermined winding angle around the axis.

3. The arrangement according to claim 2, wherein the winding angle is larger than 200°.

4. The arrangement according to claim 2, wherein a radius of the first portion of the coil spring is approximated to a radius of the rolling contact bearing.

5. The arrangement according to claim 1, wherein the first portion of the coil spring is arranged along the winding angle in a second plane arranged perpendicular to the axis.

6. The arrangement according to claim 5, wherein the coil spring has a cranked second portion continuous with the first portion, which enlarges a radius of the coil spring and in which the coil spring leaves the second plane.

7. The arrangement according to claim 1, wherein a damping body is arranged between the first portion of the coil spring and the receiving body.

8. The arrangement according to claim 1, wherein the rolling-contact bearing is designed as an axial rolling-contact bearing or as an angular contact ball bearing.

9. The arrangement according to claim 1, wherein said predetermined angle, in which the winding end is positioned and which is bisected by the first plane, equals 30°.

10. The arrangement according to claim 1, wherein the winding end is arranged on the side of the angle of attack of the force application line relative to the first axis or on the side which is facing away from the angle of attack.

* * * * *